United States Patent
Allan et al.

(10) Patent No.: US 10,365,652 B2
(45) Date of Patent: Jul. 30, 2019

(54) FEASIBLE LANE ROUTING

(71) Applicant: GM GLOBAL TECHNOLOGY OPERATIONS LLC, Detroit, MI (US)

(72) Inventors: Jeremy Allan, San Francisco, CA (US); Shiva Ghose, Berkeley, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/820,760

(22) Filed: Nov. 22, 2017

(65) Prior Publication Data

US 2018/0095471 A1 Apr. 5, 2018

(51) Int. Cl.
 *G05D 1/02* (2006.01)
 *G05D 1/00* (2006.01)
(52) U.S. Cl.
 CPC ......... *G05D 1/0212* (2013.01); *G05D 1/0088* (2013.01)
(58) Field of Classification Search
 CPC ........................... G05D 1/0212; G05D 1/0088

USPC ............................................................ 701/23
See application file for complete search history.

(56) References Cited

U.S. PATENT DOCUMENTS

| | | | |
|---|---|---|---|
| 2017/0136842 A1* | 5/2017 | Anderson | B60G 17/016 |
| 2018/0047292 A1* | 2/2018 | Hashimoto | G06K 9/00798 |
| 2018/0188734 A1* | 7/2018 | Zhu | B60W 30/095 |
| 2018/0334166 A1* | 11/2018 | Zhu | B60W 30/12 |

* cited by examiner

*Primary Examiner* — Marthe Y Marc-Coleman
(74) *Attorney, Agent, or Firm* — Lorenz & Kopf, LLP (57) ABSTRACT

Systems and method are provided for controlling a vehicle. The systems and methods calculate lane plan data including a set of lane plans defining a route from a start location to a destination location, solve a motion planning algorithm to produce solved lane plan data defining a solved lane plan and a trajectory therefor, receive forthcoming distance data representing a forthcoming distance, determine a feasible lane based on the solved lane plan data within the forthcoming distance, remove a lane plan from the lane plan data to produce feasible lane plan data including a feasible lane plan defining a route from the start location to the destination location, and control motion of the vehicle based on the feasible lane plan data.

10 Claims, 6 Drawing Sheets

FEASIBLE LANE ROUTING

TECHNICAL FIELD

The present disclosure generally relates to autonomous vehicles, and more particularly relates to systems and methods for routing autonomous vehicles from a start location to a destination location.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous vehicles may be equipped with a router that generates route data directing the autonomous vehicle to a destination location. When a new route is generated, e.g. as a result of a new destination request, the autonomous vehicle should choose safe and smooth routes.

Accordingly, it is desirable to provide systems and methods that route or re-route autonomous vehicles in a safe and comfortable way. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for controlling a vehicle. In one embodiment, a computer implemented method of controlling an autonomous vehicle includes generating, via a processor, lane plan data including a set of lane plans routing the autonomous vehicle from a start location to a destination location, determining, via a processor, a lane plan in the lane plan data to be infeasible, removing, via a processor, the lane plan from the lane plan data that is determined to be infeasible, thereby producing feasible lane plan data including a lane plan routing the vehicle from the start location to the destination location, and controlling, via a processor, motion of the autonomous vehicle based on the feasible lane plan data.

In various embodiments, lanes on a map are broken into segments identified by unique numbers called lane ids. In embodiments, a lane plan includes a sequence of connected lane ids. A route from the start location to the destination location is represented by a lane plan. There can be many such lane plans that go to the destination location, which are included in the set of lane planes.

In embodiments, determining the lane plan in the lane plan data to be infeasible includes determining a lane plan in the lane plan data that is infeasible when the lane plan is determined to include insufficiently smooth motion of the autonomous vehicle within a forthcoming distance.

In embodiments, the method includes determining, via a processor, a feasible lane within a forthcoming distance that the autonomous vehicle should continue to follow to ensure sufficient smoothness of motion of the autonomous vehicle, wherein the step of determining a lane plan in the lane plan data to be infeasible includes determining a lane plan in the lane plan data to be infeasible if the lane plan does not include the feasible lane.

In embodiments, the method includes receiving speed data representing current speed of the autonomous vehicle, and determining, via a processor, forthcoming distance data representing the forthcoming distance based on the speed data, wherein greater forthcoming distances are determined at greater current speeds.

In embodiments, the method includes solving, via a processor, a motion planning algorithm on lane plan data to produce solved lane plan data defining a lane plan routing the vehicle from the start location to the destination location and a trajectory therefor, and controlling motion of the autonomous vehicle based on the solved lane plan data In embodiments, the method includes solving, via a processor, a motion planning algorithm on lane plan data to produce solved lane plan data defining a lane plan routing the vehicle from the start location to the destination location and a trajectory therefor, and determining the feasible lane based on the solved lane plan data. In embodiments, the motion planning algorithm produces plural different lane plans, which are included in the solved lane plan data. A feasible lane (or a plurality of feasible lanes) is determined for each solved lane plan. The step of removing the lane plan from the lane plan data that is determined to be infeasible is performed for each lane plan in the lane plan data including the or each feasible lane determined for each solved lane plan.

In embodiments, the method includes excluding a lane plan from the solved lane plan data when a solution to the motion planning algorithm is not found.

In embodiments, solving the motion planning algorithm is based on inputs including a centerline representing a path that the autonomous vehicle should follow and boundaries representing boundaries that the autonomous vehicle should not cross.

In embodiments, the method includes virtually traversing, via a processor, the lane plan defined by the solved lane plan data for the forthcoming distance and recording a traversed lane, wherein the traversed lane is output as the feasible lane.

In another embodiment, an autonomous driving system is included. The system includes a router module configured to calculate lane plan data including a set of lane plans defining a route from a start location to a destination location. A motion planning system is configured to solve a motion planning algorithm to produce solved lane plan data defining a solved lane plan and a trajectory therefor. A feasible lane plan determination module is configured to receive forthcoming distance data representing a forthcoming distance and to determine a feasible lane based on the solved lane plan data within the forthcoming distance. An infeasible lane plan removal module is configured to remove a lane plan from the lane plan data to produce feasible lane plan data including a feasible lane plan defining a route from the start location to the destination location. A vehicle control system is configured to control motion of the vehicle based on the feasible lane plan data.

In embodiments, the feasible lane plan data is fed back, and run through, the motion planning system.

In embodiments, a forthcoming distance determination module is configured to receive speed data representing current speed of the autonomous vehicle and determine the forthcoming distance based on the speed data, wherein greater forthcoming distances are determined at greater current speeds.

In embodiments, the motion planning system is configured to receive inputs including a centerline representing a path that the autonomous vehicle should follow and boundaries representing boundaries that the autonomous vehicle should not cross and solves the motion planning algorithm based thereon to define a smooth motion trajectory for the autonomous vehicle to follow through operation of the vehicle control system.

In embodiment, the motion planning system is configured to exclude a lane plan from the solved lane plan data when a solution to the motion planning algorithm is not found.

In embodiments, the feasible lane plan determination module is configured to virtually traverse the lane plan defined by the solved lane plan data for the forthcoming distance and record a traversed lane, wherein the traversed lane is output as the feasible lane.

In yet another embodiment, an autonomous vehicle is provided. The autonomous vehicle includes an autonomous driving system configured, via a processor, to: calculate lane plan data including a set of lane plans defining a route from a start location to a destination location, solve a motion planning algorithm to produce solved lane plan data defining a solved lane plan and a trajectory therefor, receive forthcoming distance data representing a forthcoming distance, determine a feasible lane based on the solved lane plan data within the forthcoming distance, remove a lane plan from the lane plan data to produce feasible lane plan data including a feasible lane plan defining a route from the start location to the destination location, and control motion of the vehicle based on the feasible lane plan data.

In embodiments, the feasible lane plan data is fed back and used as the basis for solving the motion planning algorithm.

In embodiments, the autonomous driving system is configured to receive speed data representing current speed of the autonomous vehicle and to determine the forthcoming distance based on the speed data, wherein greater forthcoming distances are determined at greater current speeds.

In embodiments, the autonomous driving system is configured, via the processor, to exclude a lane plan from the solved lane plan data when a solution to the motion planning algorithm is not found.

In embodiments, the autonomous driving system is configured, via the processor, to virtually traverse the lane plan defined by the solved lane plan data for the forthcoming distance and record a traversed lane, wherein the traversed lane is output as the feasible lane.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
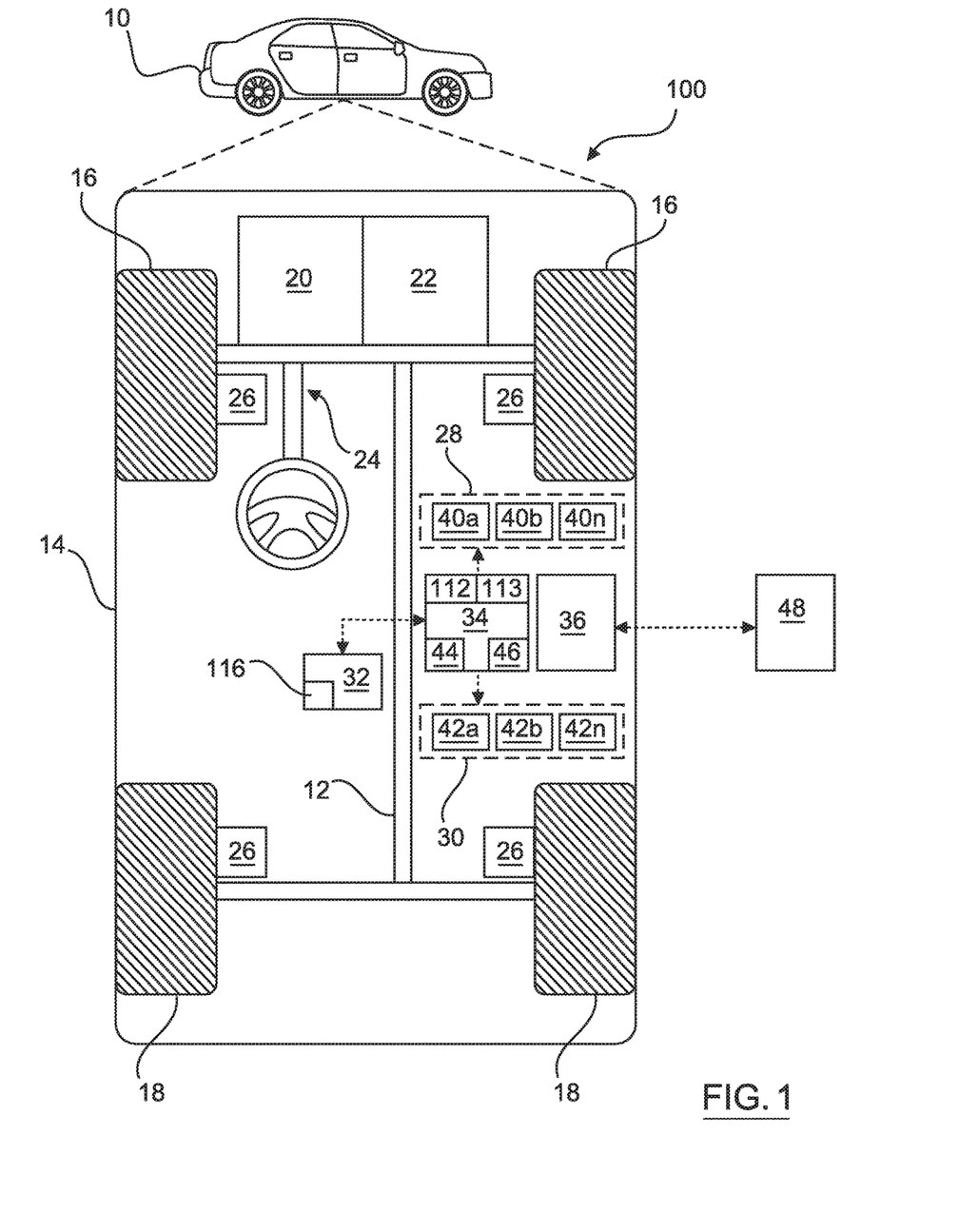
FIG. 1 is a functional block diagram illustrating an autonomous vehicle having a motion planning system and a feasible lane plan filter, in accordance with various embodiments.

With reference to FIG. 1, a motion planning and feasible lane filtering system shown generally at 100 is associated with a vehicle 10 in accordance with various embodiments. In general, the system 100 reroutes the autonomous vehicle 10 in a way that excludes infeasible routes that involve unsafe and/or uncomfortable changes of direction and intelligently controls the vehicle 10 based thereon. The system 100 looks ahead a forthcoming distance, which is speed dependent, along each lane plan from a router module and removes lane plans that do not continue along paths, for the forthcoming distance, that have already been identified by a motion planning system as having acceptably smooth trajectories. In this way, the autonomous vehicle 10 selects a new route that it can transition to from a previous route in a safe and comfortable manner.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the motion planning and feasible lane filtering system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
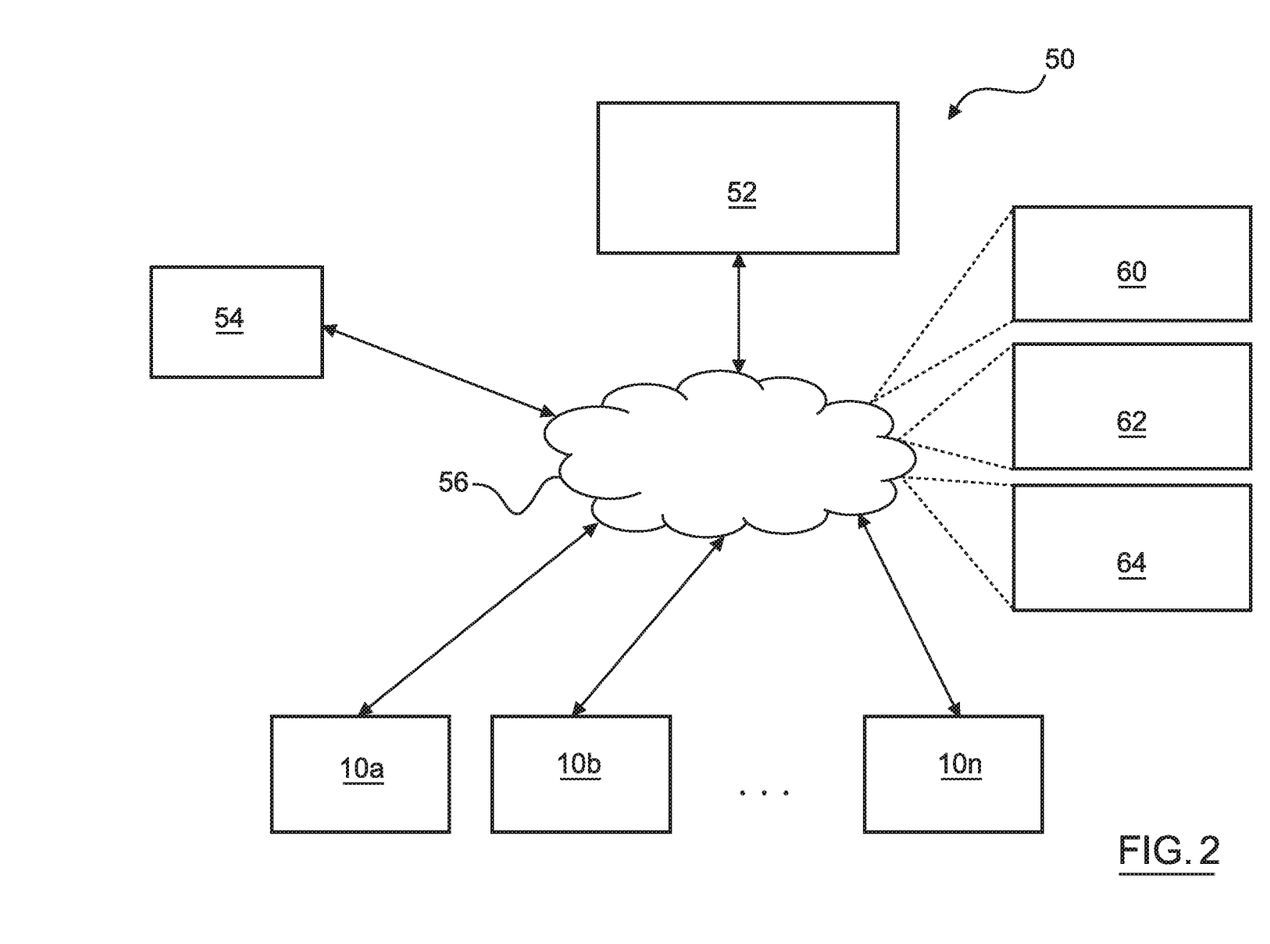
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined navigation maps 142 of the navigable environment. In various embodiments, the defined navigation maps 142 may be predefined by and obtained from a remote system (described in further detail with regard to FIG. 2). For example, the defined navigation maps 142 may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the motion planning and feasible lane filtering system 100 and, when executed by the processor 44, cause a router module to generate a new route from a start location to a destination location. The new route is defined by lane plan data including a set of lane plans. Each lane plan defines a different route to the destination. A motion planning algorithm solves previous lane plans from the router module to provide a trajectory for the vehicle to follow. The processor 44 is configured to identify feasible lanes in the solved lane plans within a determined forthcoming distance. The forthcoming distance is determined so as to be greater with greater travelling speeds. These feasible lanes define motion paths that have already been identified by the motion planning system as safe and comfortable. Lane plan data in the new route that does not include the identified feasible lanes is excluded, whilst the lane plan data that is kept is used as a basis for motion planning and vehicle control. In this way, unsafe and/or uncomfortable sudden (i.e. within the determined forthcoming distance) changes in direction are avoided.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
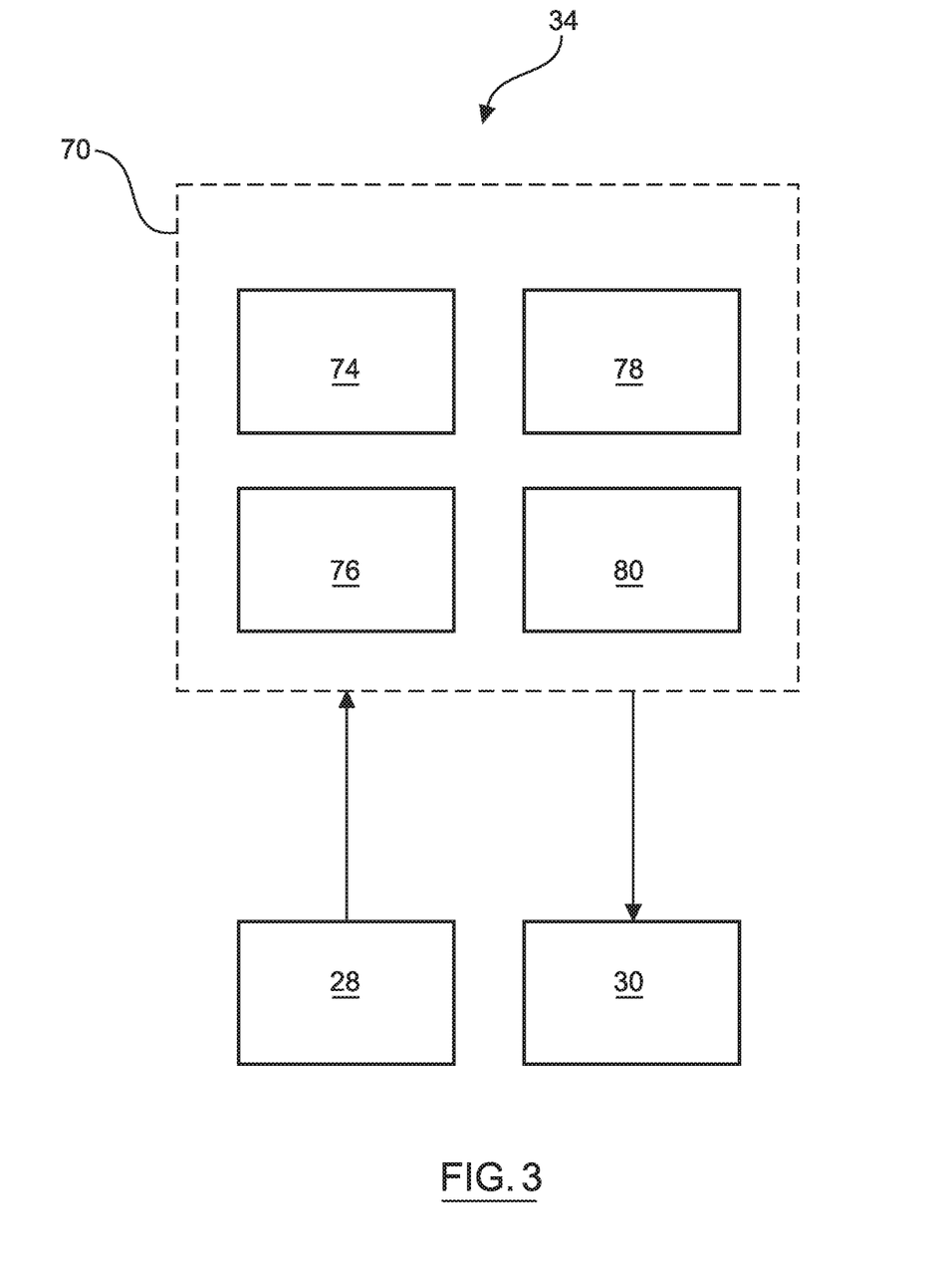
FIGS. 3 and 4 are dataflow diagrams illustrating an autonomous driving system that includes the motion planning system and feasible lane plan filter of the autonomous vehicle, in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the motion planning and feasible lane filtering system 100 of FIG. 1 is included within the ADS 70, as will be described further below.

Figure 4:
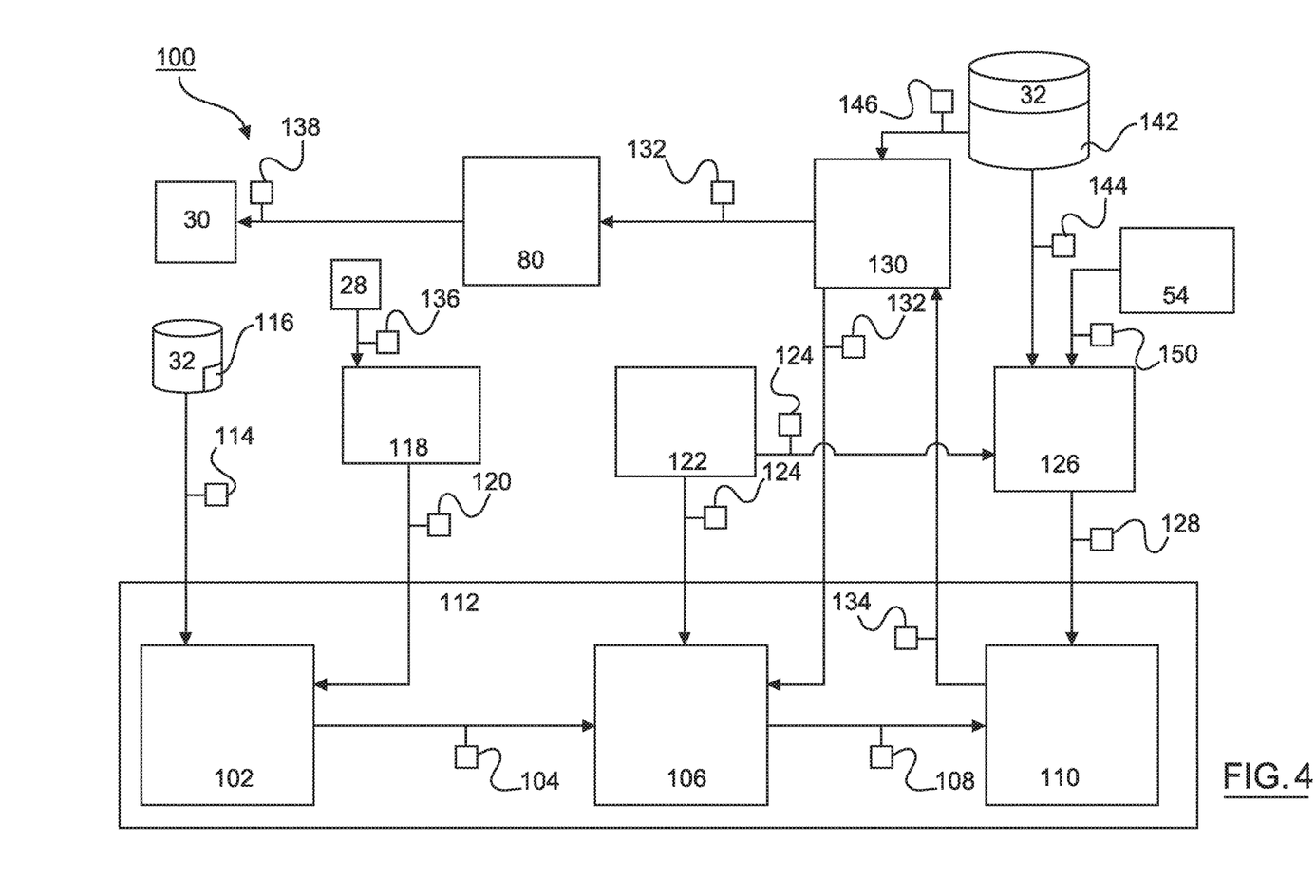

For example, as shown in more detail with regard to FIG. 4 and with continued reference to FIG. 3, the motion planning and feasible lane filtering system 100 includes a feasible lane plan filter 112, a motion planning system 130 and a router module 126. In various embodiments, the router module 126, the feasible lane plan filter 112 and the motion planning system 130 are included in the guidance system 78 of FIG. 3. Generally, and in some embodiments, the motion planning system 130 is configured to solve routes from a start location to a destination location to produce motion trajectories for the autonomous vehicle as part of solved lane plan data 132. The solved lane plan data 132, having been run through the motion planning system 130, is considered to define safe and comfortable paths for the autonomous vehicle 10. The motion planning system 130 works on routes defined in feasible lane plan data 134 that have been calculated by the router module 126. The feasible lane plan filter 112 determines a forthcoming distance based on current speed of the autonomous vehicle 10 and, in producing feasible lane plan data 134 for the motion planning system 130, excludes lane plans received from the router module 126 that do not follow lane plans defined by the solved lane plan data 132 for the forthcoming distance. The motion planning system 130 and the vehicle control system 80 controls motion of the autonomous vehicle 10 based on the filtered feasible lane plan data 134. In this way, unsmooth motion of the autonomous vehicle 10 within the forthcoming distance, as a result of re-routing, is avoided.

In various embodiments, the motion planning system 130 is configured to receive lane plan data (in this case, feasible lane plan data 134) that defines lane plans from a start location to a destination location. In the system of FIG. 4, the feasible lane plan data 132 has been filtered to remove infeasible lane plans, as described further herein. The motion planning system 130 is configured to receive boundaries and centerline data 146 from navigation map data 144 obtained from the navigation map 142 stored in the at least one storage device 142. The boundaries and centerline data 146 defines boundaries through which the autonomous vehicle 10 should not pass and a centerline defining a desired or target trajectory. In embodiments, the feasible lane plan data 134 defines one or more sets of lane identifiers (or lanes) making up a route from the start location to the destination location. In various embodiments, more than one set of lane identifiers are included in the feasible lane plan data 134, with each set of lane identifiers representing a route, as planned by the router module 126, between the start location and the destination location. The motion planning system 130 is configured to retrieve from the navigation map 142 boundaries and centerline data 146 including boundaries and centerlines for each of the identified lanes.

In various embodiments, the motion planning system 130 is configured to operate a motion planning algorithm to generate, for each set of lane identifiers in the feasible lane plan data 132, a motion trajectory defining a smooth path along each lane between the start location and the destination location. The smoothness of the path is a facet of the set of lane identifiers being solved by a motion planning algorithm to define a trajectory having curve continuity and continuously defining the curve. In some embodiments, the motion planning algorithm solves a fifth order polynomial defining a path given, as inputs, way points provided by the centerlines and boundary conditions provided by, inter alia, the boundaries. The motion planning algorithm produces a smoothly curved trajectory that is continuous throughout (e.g. has second order curve continuity). The trajectory is, in embodiments, made up of coordinates defining the smoothly curved trajectory. A variety of polynomial based path planning algorithms are known in the art, as are path planning algorithms that are not polynomial based, such as search based algorithms. The motion planning system 130 outputs solved lane plan data 132 including the solved path trajectory for each set of lane identifiers included in the input feasible lane plan data 134. The motion planning system 130 thus persistently outputs solved paths for each input lane plan in the feasible lane plan data 134 when the input lane plan is solvable. When the motion planning system 130 is not able to solve a path for one or more input lane plans, each unsolved lane plan is excluded from the output solved lane plan data 132. As such, unsmooth lane plans, which are not able to be solved by the motion planning algorithm, are not included in the solved lane plan data 132.

In various embodiments, the feasible lane plan filter 112 includes an infeasible lane plan removal module 110, a feasible lane plan determination module 106 and a forthcoming distance determination module 102. In various embodiments, the forthcoming distance determination module 102 is configured to determine a forthcoming distance, embodied in forthcoming distance data 104, that increases with greater vehicle speed. The feasible lane plan determination module 106 is configured to virtually traverse each lane plan in the solved lane plan data 132 for the forthcoming distance and to record a set of one or more lane identifiers that have been traversed. That is, the feasible lane plan determination module 106 analyses each lane plan in the solved lane plan data 132 to record respective sets of one or more lane identifiers included in each lane plan for the forthcoming distance. Each set of recorded lane identifiers represent lanes that are determined to be required for a feasible lane plan so that uncomfortable and/or unsafe changes of direction are not executed. Such uncomfortable and/or unsafe changes of direction could otherwise occur if changes of direction were to take place within the forthcoming distance because of the current speed of the vehicle and the suddenness of the change of direction. By algorithmically excluding routes that change direction within that forthcoming distance, more gradual, more comfortable motion trajectories are selected. The recorded sets of lane identifiers are embodied in feasible lane data 108. The infeasible lane plan removal module 110 removes from the lane plan data 128 lane plans that do not include one of the sets of lane identifiers in the feasible lane data 108. A filtering process is thus executed that ensures motion planning, via motion planning system 130, and vehicle control, via vehicle control system 80, are performed on the basis of lane plan data that is determined to be feasible in terms of not including sudden changes of direction when a new route is calculated.

In accordance with some embodiments, the forthcoming distance determination module 102 is configured to receive speed data 120 representative of current vehicle speed from odometery module 118. Speed data 120 is determined by the odometery module based on sensed speed data 136 from sensor system 28. The forthcoming distance determination module 102 is configured to transform the speed data 120 into distance units embodied in the forthcoming distance data 104. The forthcoming distance 104 is a distance ahead of the vehicle along the route. The forthcoming distance 104 varies with speed of the vehicle, as determined by the forthcoming distance determination module 102. In embodiments, the forthcoming distance determination module 102 is configured to utilize a speed to distance transformation map 116 stored in the at least one storage device 32 and embodied in speed to distance map data 114. In other embodiments, an algorithm is used to transform the speed data to distance data. The following constitutes an example for an exemplary autonomous vehicle 10 for speed to forthcoming distance transformation and should not be considered limiting:

| Speed (m/s) | Forthcoming distance (m), (from the center of the rear axle) |
|---|---|
| <0.1 | 0 |
| 0.1 to 0.5 | 4.82 |
| 0.5 to 2.2 | 6.7 |
| 2.2 to 5.0 | 10 |
| >5 | x * speed + c, where x and c are, for example, empirically determinable variables that define an increasing forthcoming distance as speed increases |

In various embodiments, the feasible lane plan determination module 106 is configured to receive as inputs solved lane plan data 132 and current position data 122 and to output feasible lane data 108. The current position data 122 is received from the localization module 122, which is, in some examples, included in the positioning system 76 of FIG. 3. The solved lane plan data 132 defines one or more, usually more than one, set of lane plans representing a path from the start location to the destination location that was able to be solved by the motion planning system 130. For each of the lane plans in the solved lane plan data 132, the feasible lane plan determination module 106 is configured to locate the autonomous vehicle 10 in the lane plan based on the current position data 122, virtually traverse center points of the lane plan for the forthcoming distance embodied in the forthcoming distance data 104, and record one or more lane identifiers included in the traversal. The recorded one or more lane identifiers form a set of lane identifiers for a given solved lane plan in the solved lane plan data 132 and this process is repeated for each solved lane plan. The sets of lane identifiers are embodied in feasible lane data 108 that is output from the feasible lane plan determination module 106.

In embodiments, the infeasible lane plan removal module 110 is configured to receive lane plan data 128 from the router module 126 and to receive the feasible lane data 108 from the feasible lane plan determination module 106. The infeasible lane plan removal module 110 is configured to remove from the lane plan data 128 lane plans that do not include one of the sets of feasible lanes from the feasible lane plan data 128 and thus are considered infeasible. That is, if one or more lane plans from the router module 126 does not continue along a solved lane plan from the motion planning system 130 for the forthcoming distance, which information is imparted from the feasible lane data 108, then those one or more lane plans are discarded. The infeasible lane plan removal module 110 outputs feasible lane plan data 134 without lane plans deemed to be infeasible.

The motion planning system 130 is configured to determine trajectories for each feasible lane plan in the feasible lane plan data 134 and to output such trajectories in the solved lane plan data 132, as has been described heretofore. The vehicle control system 80 is configured to receive the solved lane plan data 132 and to decide upon an optimal one of the solved lane plans. The optimal solved lane plan is, in some embodiments, selected based on shortest distance, but when there is an obstruction (for example), the vehicle control system 80 is configured to switch to an alternative solved lane plan that avoids the obstacle. The vehicle control system 80 is configured to determine actuator commands 138 for the actuator system 30 that instruct the autonomous vehicle 10 to traverse the selected solved lane plan.

In various embodiments, the router module 126 is configured to receive navigation map data 144, start location data and destination location data 150 as inputs and to output the lane plan data 128. The navigation map data 144 includes a detailed map of lane identifiers whereby roads are each divided into segments. For multi-lane roads, plural lane segments run in parallel and are each identified by respective lane identifiers. The router module 126 is configured to run a routing algorithm to determine upon a plurality of alternative routes from the start location to the destination location based on routing preferences. The alternative routes so determined are embodied in respective sets of lane identifiers in lane plan data 128, with each set of lane identifiers making up a route from the start location to the destination location. In some embodiments, the start location is the current location as embodied in current location data 124 from localization module 122. The destination location data 150 is set by user input through user device 54, in some embodiments. In other embodiments, the destination location data 150 is set by a dispatch system of the autonomous vehicle based transportation system 52 shown in FIG. 2. The user input is through a remote handset, a mobile telephone, an in-car interface, etc. in various embodiments.

According to the systems and methods described herein, when a new destination is received by the router module 126, or new route data is calculated by the router module 126 for some other reason, the autonomous vehicle 10 will continue along lane plans in the new lane plan data 128 that follow, for the forthcoming distance, previously solved lane plan data 132, which has been solved based on previous lane plan data 128 from the router module 126. In this way, sudden, potentially unsafe and/or uncomfortable, changes in the path followed by the autonomous vehicle 10 are avoided.

Figure 5:
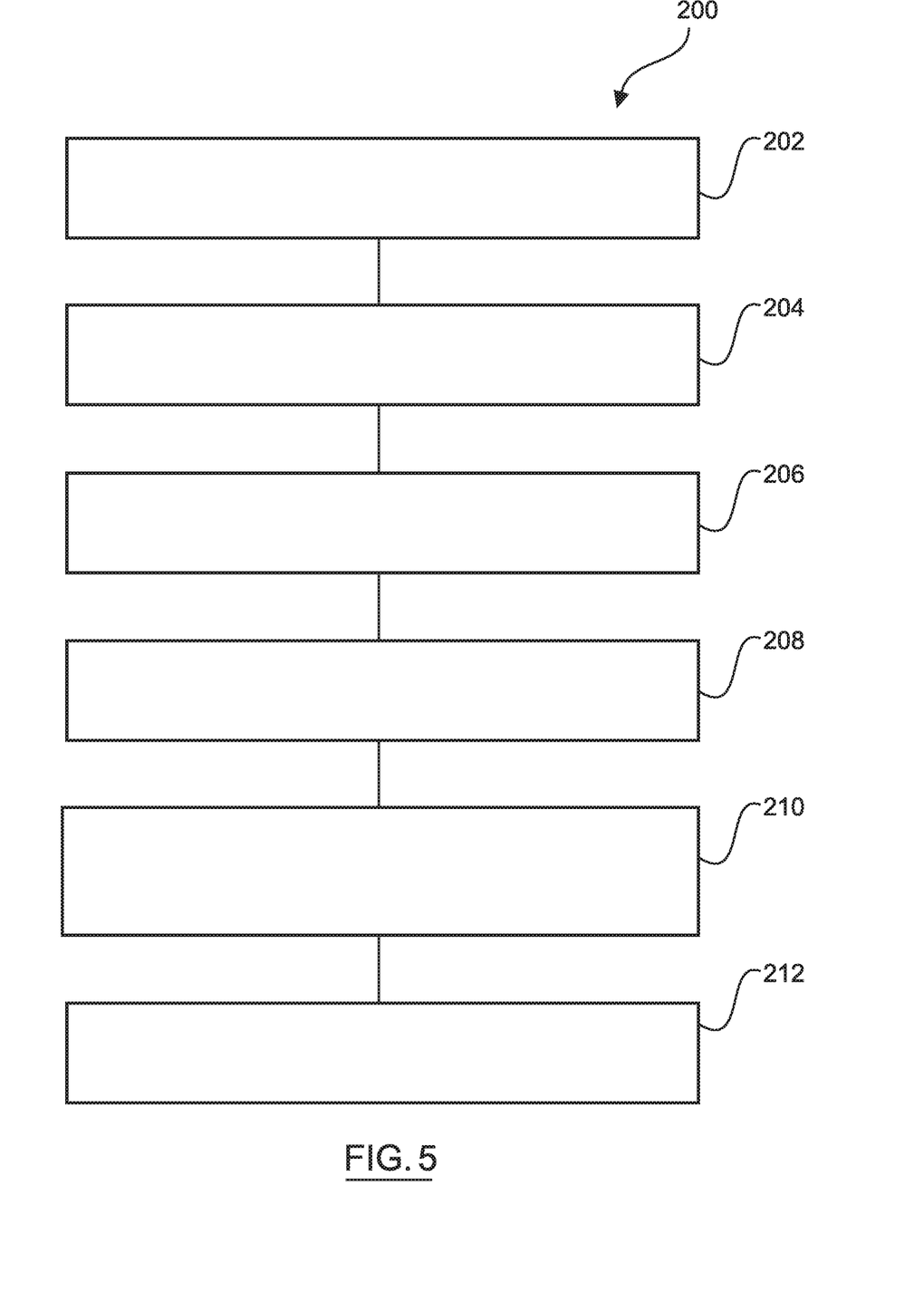
FIG. 5 is a flowchart illustrating a control method for controlling the autonomous vehicle, in accordance with various embodiments.

Referring now to FIG. 5, and with continued reference to FIGS. 1-4, a flowchart illustrates a control method 200 that can be performed by the motion planning and feasible lane filtering system 100 of FIG. 1 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 400 can be scheduled to run based on one or more predetermined events, and/or can run continuously during operation of the autonomous vehicle 10.

In step 202, lane plan data is generated via the router module 126. In various embodiments, the router module 126 receives start and destination locations, runs a routing algorithm and produces lane plan data 128 including a set of different lane plans, whereby each lane plan includes a list of lane IDs plotting a route from the start location to the destination location.

In step 204, solved lane plan data 132 is received from the motion planning system 130. In various embodiments, the solved lane plan data 132 defines trajectories for the autonomous vehicle 10 to follow for a number of alternative lane plans. The motion planning system 130 receives the boundaries and centerline data 146 and uses a path planning algorithm to define a trajectory for each received lane plan that can be solved. The solved trajectory is included in solved lane plan data 132. Some received lane plans may not be solvable and are excluded from solved lane plan data 132.

In step 206 forthcoming distance data 104 is received from forthcoming distance determination module 102. In various embodiments, the forthcoming distance data 104 is calculated by the forthcoming distance determination module 102 based on current speed of the autonomous vehicle 10 so as to define larger distances with greater speeds.

In step 208, feasible lanes are identified in the solved lane plan data 132 received from the motion planning system 130 by the feasible lane plan determination module 106, thereby producing feasible lane data 108. In various embodiments, the feasible lane plan determination module 106 receives current position data 124, the forthcoming distance 104 and the solved lane plan data 132 and identifies one or more lanes in each lane plan in the solved lane plan data 132 for the forthcoming distance from the current position, thereby producing an array of one or more feasible lanes as the feasible lane data 108. In particular, the current location in each lane plan in the solved lane plan data 132 is determined. Each lane identifier along the solved lane plan from the current location to the end of the forthcoming distance is recorded, and the recorded lane identifiers are output as one field of an array of feasible lanes. This process is repeated for each lane plan in the solved lane plan data 108 to fill the array of feasible lanes making up the feasible lane data 108.

At step 210, lane plans in the lane plan data 128 from the router 128 are removed when they do not include the identified feasible lanes of the feasible lane plan data 108 via the infeasible lane plan removal module 110, thereby producing feasible lane plan data 134. In various embodiments, each lane plan included in the lane plan data 128 is analyzed to determine whether it includes one of the entries in the array feasible lanes included in the feasible lane data 108. Each entry in the array of feasible lanes may include on ore more lane identifiers. For each lane plan not included one of the feasible lane entries, the lane plan is removed from the lane plan data 128. This step ensures that only lane plans that follow previously solved lane plans for the forthcoming distance are output to the motion planning system 130, thereby avoiding unsmooth maneuvers when a new route or a reroute is received from the router module 126.

In step 212, the autonomous vehicle 10 is controlled based on the feasible lane data 108, via the motion planning system 130 and the vehicle control system 80. In various embodiments, the motion planning system 130 solves a path planning algorithm for each lane plan in the feasible lane plan data 130, which produces trajectories used by the vehicle control system 80 to generate actuator commands 138 to follow a selected trajectory. Further, solved lane plan data 132 is generated by the motion planning system 130 based on the feasible lane plan data 134 (with unsolvable lane plans being excluded) and fed back to the feasible lane plan determination module 106 for use in producing feasible lane plan data 108, as discussed heretofore.

Figure 6:
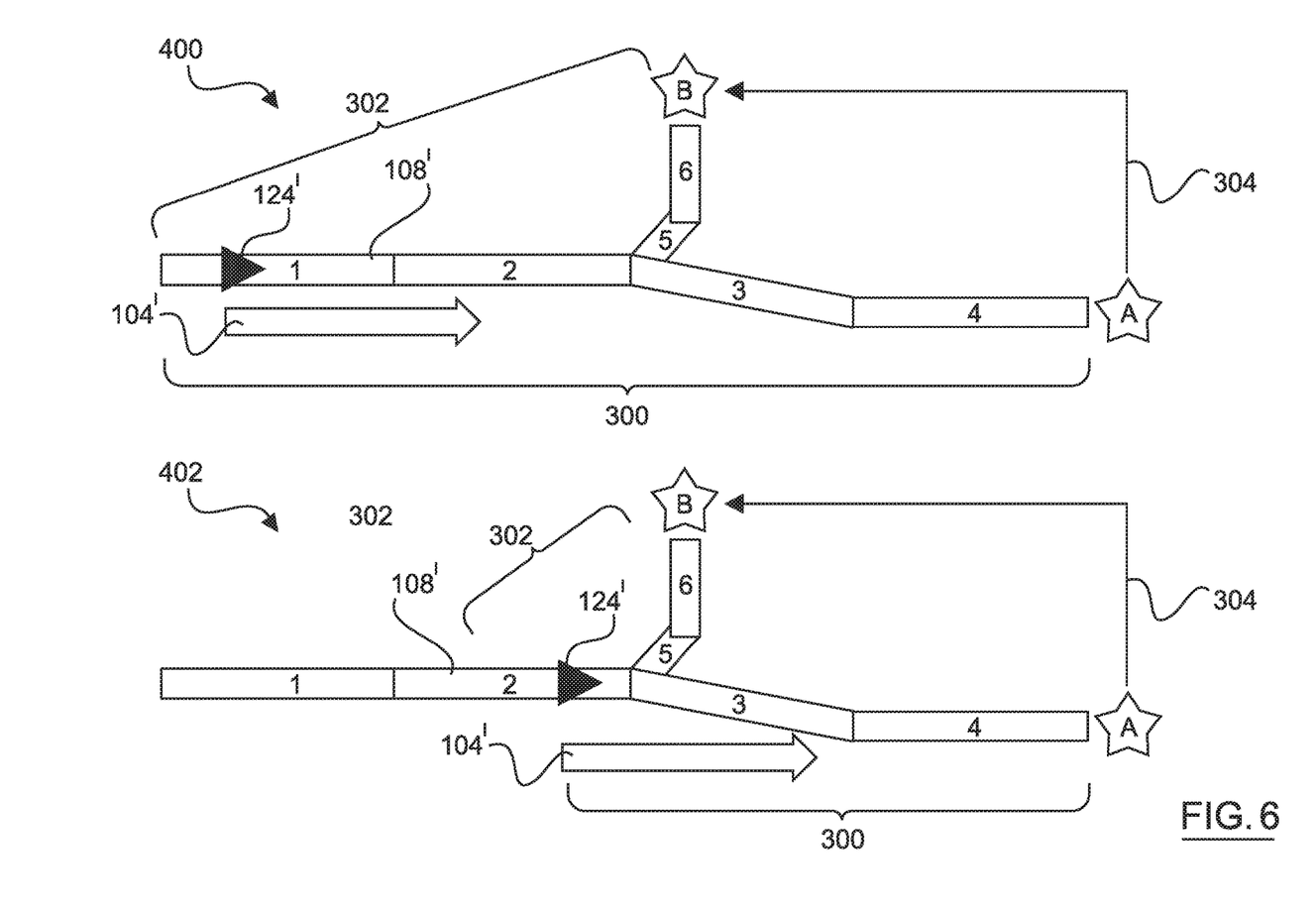
FIG. 6 is a diagram illustrating example use cases when rerouting an autonomous vehicle, in accordance with various embodiments.

FIG. 6 illustrates an exemplary use case of the systems and methods described herein with reference to FIGS. 1 to 5. In the first schematic diagram 400 a first route 300 to destination location A is shown. The first route 300 is determined by the router module 126 to include a lane plan including lanes 1, 2, 3, 4. Only one lane plan is shown in the example for simplicity, although the router module 126 generally outputs a set of lane plans as part of lane plan data 128. The lane plan to A is solved by the motion planning system 130 to provide a trajectory for the autonomous vehicle 10 to follow. Further, localization module 122 determines the current position 124' of the autonomous vehicle and the forthcoming distance determination module 102 calculates the forthcoming distance 104' based on the current position 124' and the speed of the autonomous vehicle 10. The feasible lane plan determination module 106 follows (virtually traverses) the solved route from the current position 124' for the forthcoming distance and outputs the traversed lanes 1 and 2 as the feasible lanes in the feasible lane data 108.

Assuming that the autonomous vehicle 10 is rerouted from A to B as the destination location (e.g. as a result of destination location being received from a passenger or a dispatch system), the router module 126 outputs two lane plans in the example (it being understood that generally more than two possibilities would be output) including a second, shorter, route 302 and a third longer route 300+304. The second route 302 includes lanes 1, 2, 5, 6. The third route 300+304 includes lanes 1, 2, 3, 4 and further lanes 304 not shown. Such lane identifiers are obtained from route map data 144 and define an ordered path from the current location 124' to the destination location A or B. The router module 126 runs different routing algorithms or algorithms with different preferences or settings to obtain alternative routes, where these routes are defined by the ordered lane identifiers. Since both the second and third routes 302, 300+304 include the feasible lanes 1, 2 determined by the feasible lane determination module 106, neither of the routes 302, 304 is removed by the infeasible lane plan removal module 110 and both routes 302, 304 are included in the feasible lane plan data 134. The motion planning system 130 and the vehicle control system 80 controls the autonomous vehicle 10 based on the routes 302, 304 included in the feasible lane plan data 134. The shorter route 302 is selected to be followed in the present example use case.

In schematic diagram 402, the current position 124' is more advanced along the first route 300 such that the forthcoming distance data 104' extends to lane 3 from the current position 124'. That is, lanes 2, 3 are identified by the feasible lane plan determination module 106 and output as part of the feasible lane data 108. Lanes 2, 3 are defined to be included in feasible lane plan data because these lanes have already been included in a smooth trajectory according to solved lane plan data 132 as determined by motion planning system 130. Based on the current position of the vehicle 10 and the current speed of the vehicle, as embodied in forthcoming distance data 104', any change of direction within the forthcoming distance would be undesirably sudden or unsmooth. As such, the present system insists that any recalculated routes must include the vehicle continue to travel along lanes 2, 3. Changes of direction outside of the forthcoming distance, beyond lanes 2, 3, would not be unacceptably sudden and are permitted. Again, assuming that the router module 126 reroutes from destination location A to destination location B, second and third routes 302, 300+304 would be output in the lane plan data 128, as described previously. However, the second route 302, comprised of lanes 2, 5, 6, does not include both feasible lanes 2, 3 and thus would be excluded from the feasible lane plan data 134 by the infeasible lane plan removal module 110. The third route 300+304, comprised of lanes 2, 3, 4 and further lanes 304, does include both feasible lanes 2, 3 and thus would not be excluded from the feasible lane plan data 134. The third route 300+304 would be used as the basis for motion planning and vehicle control through the vehicle control system 80 and the motion planning system 130. In this way, although the longer route 304 has been used, a situation has been avoided where an uncomfortable and potentially unsafe sudden change in direction is one of the possibilities included in lane plan data 134 for motion planning and vehicle control.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A computer implemented method of controlling an autonomous vehicle, the method comprising:
   generating, via a processor, lane plan data comprising a set of lane plans routing the autonomous vehicle from a start location to a destination location;
   solving, via a processor, a motion planning algorithm on lane plan data to produce solved lane plan data defining at least one lane plan routing the vehicle from the start location to the destination location and a trajectory therefor;
   excluding at least one lane plan from the solved lane plan data when a solution to the motion planning algorithm is not found;
   determining, via a processor, at least one feasible lane within a forthcoming distance that the autonomous vehicle should continue to follow to ensure sufficient smoothness of motion of the autonomous vehicle based on the solved lane plan data;
   determining, via the processor, at least one lane plan in the lane plan data to be infeasible if the at least one lane plan does not include the at least one feasible lane;
   removing, via the processor, the at least one lane plan from the lane plan data that is determined to be infeasible, thereby producing feasible lane plan data comprising at least one lane plan routing the vehicle from the start location to the destination location; and
   controlling, via the processor, motion of the autonomous vehicle based on the feasible lane plan data.

2. The method of claim 1, wherein determining at least one lane plan in the lane plan data to be infeasible comprises determining at least one lane plan in the lane plan data that is infeasible when the at least one lane plan is determined to include excessively sudden changes of direction of the autonomous vehicle within a forthcoming distance.

3. The method of claim 2, comprising receiving speed data representing current speed of the autonomous vehicle, and determining, via a processor, forthcoming distance data representing the forthcoming distance based on the speed data, wherein greater forthcoming distances are determined at greater current speeds.

4. The method of claim 1, comprising solving, via a processor, a motion planning algorithm on lane plan data to produce solved lane plan data defining at least one lane plan routing the vehicle from the start location to the destination location and a trajectory therefor, and controlling motion of the autonomous vehicle based on the solved lane plan data.

5. The method of claim 1, wherein solving the motion planning algorithm is based on inputs including a centerline representing a path that the autonomous vehicle should follow and boundaries representing boundaries that the autonomous vehicle should not cross.

6. The method of claim 1, comprising virtually traversing, via a processor, the at least one lane plan defined by the solved lane plan data for the forthcoming distance and recording at least one traversed lane, wherein the at least one traversed lane is output as the at least one feasible lane.

7. An autonomous vehicle comprising
an autonomous driving system configured, via at least one processor, to:
   calculate lane plan data comprising a set of lane plans defining a route from a start location to a destination location;
   solve a motion planning algorithm to produce solved lane plan data defining at least one solved lane plan and a trajectory therefor;
   receive forthcoming distance data representing a forthcoming distance;
   determine at least one feasible lane based on the solved lane plan data within the forthcoming distance;
   remove at least one lane plan from the lane plan data to produce feasible lane plan data including at least one feasible lane plan defining a route from the start location to the destination location; and
   control motion of the vehicle based on the feasible lane plan data,
   wherein the autonomous driving system is configured, via the at least one processor, to exclude at least one lane plan from the solved lane plan data when a solution to the motion planning algorithm is not found.

8. The autonomous vehicle of claim 7, wherein the feasible lane plan data is fed back and used as the basis for solving the motion planning algorithm.

9. The autonomous vehicle of claim 7, wherein the autonomous driving system is configured, via the at least one processor, to receive speed data representing current speed of the autonomous vehicle and to determine the forthcoming distance based on the speed data, wherein greater forthcoming distances are determined at greater current speeds.

10. The autonomous driving system of claim 7, wherein the autonomous driving system is configured, via the at least one processor, to virtually traverse the at least one lane plan defined by the solved lane plan data for the forthcoming distance and record at least one traversed lane, wherein the at least one traversed lane is output as the at least one feasible lane.

\* \* \* \* \*